United States Patent
Figueroa et al.

(10) Patent No.: US 10,033,581 B2
(45) Date of Patent: Jul. 24, 2018

(54) METHOD FOR RETRIEVAL OF DEVICE-TYPE MANAGERS

(71) Applicant: Yokogawa Electric Corporation, Musashino-shi, Tokyo (JP)

(72) Inventors: Robert Figueroa, Singapore (SG); Anthony Benson Wong, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 253 days.

(21) Appl. No.: 14/962,066

(22) Filed: Dec. 8, 2015

(65) Prior Publication Data
US 2017/0163481 A1    Jun. 8, 2017

(51) Int. Cl.
G06F 15/173    (2006.01)
H04L 12/24    (2006.01)
H04L 29/06    (2006.01)

(52) U.S. Cl.
CPC .......... H04L 41/0806 (2013.01); H04L 67/42 (2013.01)

(58) Field of Classification Search
CPC ...... H04L 41/08; H04L 41/0806; H04L 67/42
USPC ................... 709/202–205, 223–229
See application file for complete search history.

(56) References Cited

U.S. PATENT DOCUMENTS

| | | | | |
|---|---|---|---|---|
| 8,205,022 B2* | 6/2012 | Isenmann | ........... | H04L 41/0806 710/305 |
| 8,762,105 B2* | 6/2014 | Fujiwara | ................ | G06Q 10/20 705/305 |
| 2006/0282334 A1* | 12/2006 | Kao | ........................ | G06Q 30/02 705/26.7 |
| 2007/0220131 A1* | 9/2007 | Ozawa | .................... | H04L 41/00 709/223 |
| 2011/0302032 A1* | 12/2011 | Ishii | .................. | G06F 17/30867 715/739 |
| 2013/0257627 A1* | 10/2013 | Rafael | ................ | G05B 19/0426 340/691.6 |

* cited by examiner

Primary Examiner — Bharat N Barot
(74) Attorney, Agent, or Firm — Westerman, Hattori, Daniels & Adrian, LLP

(57) ABSTRACT

A method for retrieval of device-type managers is provided. A historical information of user's historical selection to device-type-managers (DTMs) is identified. The historical information represents a selected DTM and a VMR information of the selected DTM. The VMR information is related to vendor, model and revision of a field device. The VMR information of the selected DTM is associated with the selected DTM. The VMR information is retrieved. The DTMs to be recommended are evaluated, based on the historical information and the VMR information associated with the DTM. A result of evaluation on the DTMs to be recommended is generated. Based on the result of evaluation, a recommend list including one or more recommended DTMs to be launched by at least one of the plurality of client devices is generated.

22 Claims, 10 Drawing Sheets

METHOD FOR RETRIEVAL OF DEVICE-TYPE MANAGERS

BACKGROUND

Technical Field

The disclosure generally relates to retrieval of device-type managers (DTMs).

Related Art

Each of different products such as plant asset management, standalone engineering tool, and other benchtop applications has its own catalog, an example of catalog is a list of different device-type-managers (DTMs). Engineers usually select a device-type-manager (DTM), based on a target field device from the list of device-type-managers (DTMs) currently installed in a client machine. Launching of the device-type-manager (DTM) is made based solely on which device-type-manager (DTM) is installed in the client so that engineers may launch outdated device-type-manager (DTM) in a case that the device-type-manager (DTM) installed in the client is outdated.

A DTM package, an installation software, is required to be installed to get a DTM for use. The DTM package includes the installation software and one or more device-type-managers (DTMs) such as communication DTM and device DTMs on a client. A user installs the DTMS using the installation software. The user associates a device-type-manager (DTM) which should be launched with a VMR information related to vendor, model and revision of a field device. A new revision of the product (plant asset management, standalone engineering tool or benchtop application) may include new versions of DTM package. When the new revision of the product is installed, the associations are freshly created and sent to the server as a default association. User association occurs when the user selects the association of VMR to a DTM and this updated association information is stored. In some products, the updated association information is stored in a server. It is hard to make the same DTM to be used, launched for a particular device by different users. It is difficult to know if there is an updated DTM which is more appropriate for the particular device.

Generally, in most of the Field Device Tool (FDT) based products the user needs to select the appropriate DTM while scanning field network for devices. Certain products show a recommended list of DTMs to the user, that is appropriate to the identified device, based on Manufacturer Identifier (Vendor), Model and Revision details of the device. The recommended DTMs shown to be used after scanning the field network is only ranked according to: 1) Manufacturer ID, 2) Model and 3) Revision (VMR). If there are a lot of DTMs that match the VMR, a user will have to spend a lot of time and of browsing to select the appropriate DTM. The time and effort spent depends on at least one or more of: experience and knowledge to identify the appropriate DTM and list of DTMs to be browsed to locate the identified DTM. The time and effort required is repeated every time when the user performs scan operation on the network. For example, if the result shows 500 DTMs, but a user usually selects the last one, he will have to keep scrolling down for every Scan request. When a scan is performed, VMR information is read from the device. This VMR information is compared to a DTM-catalog file to identify the recommended list of DTMs. Recommendation logic is based on the comparison of the two sets of information.

BRIEF DESCRIPTION OF THE DRAWINGS

The above features and advantages of the present invention will be more apparent from the following description of certain preferred embodiments taken conjunction with the accompanying drawings, in which.

DETAILED DESCRIPTIONS

Figure 1:
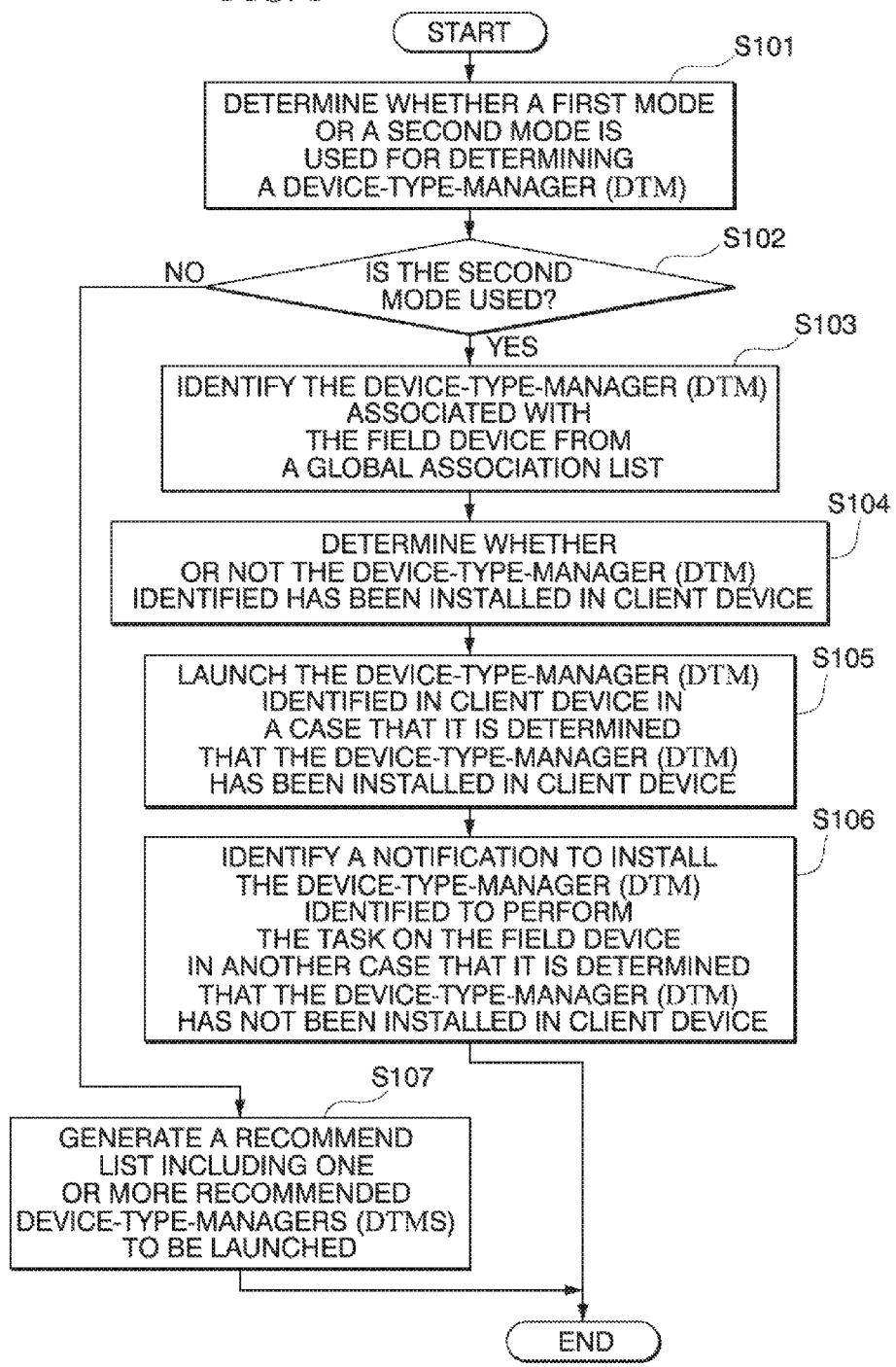
FIG. 1 is a flowchart of a method of determining a device-type manager (DTM) to be launched in at least one of a plurality of client devices which are accessible to a server.

FIG. 1 is a flowchart of a method of determining a device-type manager (DTM) to be launched in at least one of a plurality of client devices which are accessible to a server. A client device receives a request to perform a task on a field device. In Step 101, a server or computing device determines whether a first mode or a second mode is used for determining a device-type-manager (DTM) for performing a task on a field device in accordance with a request to perform the task on the field device. If in Step 102 the server or computing device determined that the second mode is used, then in Step 103 the server or computing device identifies the DTM associated with the field device from a global association list commonly available to the plurality of client devices and the server or computing device, wherein the global association list is subject to updating. In Step S104, the server or computing device determines whether or not the DTM identified has been installed in the at least one of the plurality of client devices. In Step S105, the at least one of the plurality of client devices launches the DTM identified in the at least one of the plurality of client devices in a case that server or computing device determined that the DTM has been installed in the at least one of the plurality of client devices. In Step S106, the at least one of the plurality of client devices identifies a notification to install the DTM identified to perform the task on the field device in another case that the server or computing device determined that the DTM is not installed in the at least one of the plurality of client devices. In Step S102, if the server or computing device determined that the first mode is used, the server or computing device generates a recommend list including one or more recommended DTMs to be launched in the at least one of the plurality of client devices. Each of the plurality of client devices and the server or computing device includes one or more software components, one or more memories storing the one or more software components, and one or more processors configured to execute the one or more software components to perform the computer-implemented method.

In some cases, the recommend list is sorted based on one or more predefined rules. The one or more predefined rules may include, but is not limited to, a selection history of the DTMs launched for the field devices in the at least one of the plurality of client devices.

In some cases, the task to be performed on the field device may include, but is not limited to, configuration, parameter setting, status collection, and diagnostics of the field device.

In some cases, the first mode is for a first type of user, such as an experienced user and the second mode is for a second type of user, such as an inexperienced user.

In some cases, the computing device gives the at least one of the plurality of client devices the global association list wherein the global association list has been updated by the computing device and stored in a database accessible by the computing device.

In some cases, the computing device gives the at least one of the plurality of client devices the global association list, wherein the global association list has been consolidated, by the computing, device, from a default association list and a user-defined association list. The default association list is a default list of association between the DTMs and a VMR information related to vendor, model and revision of the field device, the default association list is subject to update by the computing device upon receipt by the computing device of update information from any one of the plurality of client devices. The user-defined association list is a user-defined list of association between the DTMs and a VMR information related to vendor, model and revision of the field device, where the user-defined list of association is defined by a user.

In some cases, identifying the DTM associated with the field device in the global association list is made by the computing device, based on a field device information.

In some cases, the field device information may include, but is not limited to, at least one of vendor, model, and revision of the field device.

In some cases, the computing device updates the global association list to update association of the DTM with the field device at any of the plurality of client devices.

In some cases, the selection history of the DTMs launched may include, but is not limited to, a unique identifier for each field device.

In some cases, b-2) determining, by the computing device, whether or not the DTM identified has been installed in the at least one of the plurality of client devices is made using a DTM catalogue file.

In other cases, it can also be made using a system registry or path to determine whether or not the DTM identified has been installed in the at least one of the plurality of client devices.

In some cases, the DTM catalogue file may include, but is not limited to, a local DTM catalogue stored in the client device to identify the DTMs locally installed in the client device.

In some cases, the DTM catalogue file may include, but is not limited to, a global DTM catalogue file stored in a data base, and the global DTM catalogue file includes information indicating that all of the DTMs are installed in each of the plurality of client devices.

In some cases, the computing device gives the at least one of the plurality of client devices a historical information of user's historical selection to the DTMs.

In some cases, the computing device gives the at least one of the plurality of client devices a result of retrieval for a VMR information related to vendor, model and revision of the field device, which is associated with the DTM.

In some cases, the computing device gives the at least one of the plurality of client devices a result of evaluation on the one or more recommended DTMs, wherein the evaluation is made by the computing device, based on the historical information and the VMR information associated with the DTM.

In some cases, the computing device gives the at least one of the plurality of client devices a historical information of user's historical selection to the DTMs. The computing device gives the at least one of the plurality of client devices a result of retrieval for a VMR information related to vendor, model and revision of the field device, the VMR information being associated with the DTM. The computing device gives the at least one of the plurality of client devices a result of evaluation on the DTMs to be recommended. The historical information of user's historical selection to the DTMs represents a selected DTM and the VMR information of the selected DTM. The evaluation is made, by the computing device, based on the historical information and the VMR information associated with the DTM. In Step S107, the recommend list including the one or more recommended DTMs to be launched is generated, by the computing device, based on the result of evaluation on the DTMs to be recommended.

Figure 2:
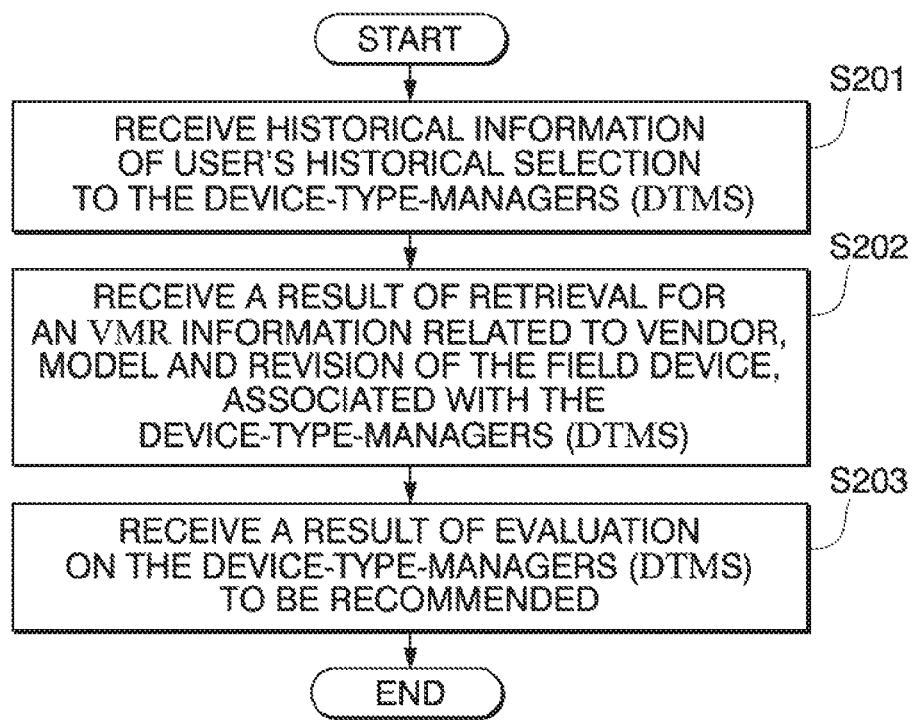
FIG. 2 is a flowchart of the process by a client device involved in the determining a device-type manager (DTM) to be launched in at least one of a plurality of client devices which are accessible to a server.

FIG. 2 is a flowchart of the process by a client device involved in the determining a device-type manager (DTM) to be launched in at least one of a plurality of client devices which are accessible to a server. In Step S201, at least one of a plurality of client devices accessible to a server or computing device receives, from the server, a historical information of user's historical selection to device-type-managers (DTMs). The historical information represents a selected DTM and a VMR information of the selected DTM. The VMR information is related to vendor, model and revision of a field device. The VMR information of the selected DTM is associated with the selected DTM. In Step S202, the at least one of the plurality of client devices receives, from the server, a result of retrieval for the VMR information which is related to vendor, model and revision of a field device and which is associated with the selected DTM. In Step S203, the at least one of the plurality of client devices receives, from the server, at least one of: a) a result of evaluation on the DTMs to be recommended, where the evaluation is made, by the server, based on the historical information and the VMR information associated with the DTM; and b) a recommend list including one or more recommended DTMs to be launched, based on the result of evaluation on the DTMs to be recommended. Each of the server and the plurality of client devices includes one or more software components, one or more memories storing the one or more software components, and one or more processors configured to execute the one or more software components to perform the method.

Figure 3:
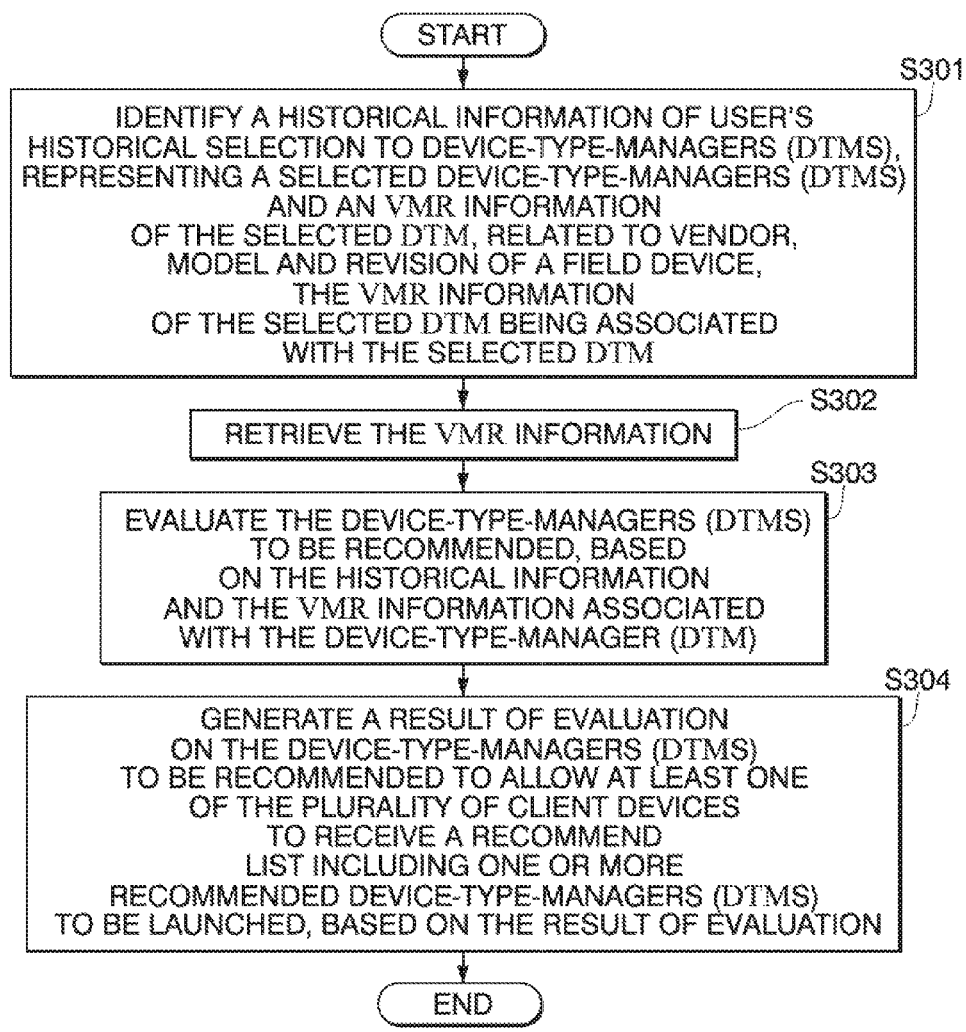
FIG. 3 is a flowchart illustrating the processes by a server or computing device for generating a result of evaluation and generating a recommend list including recommended device-type managers to be launched in client device.

FIG. 3 is a flowchart illustrating the processes by a server or computing device for generating a result of evaluation and generating a recommend list including recommended device-type managers to be launched in client device. In Step S301, a server or computing device to which a plurality of client devices is accessible identifies a historical information of user's historical selection to device-type-managers (DTMs). The historical information represents a selected DTM and a VMR information of the selected DTM. The VMR information is related to vendor, model and revision of a field device. The VMR information of the selected DTM is associated with the selected DTM. In Step S302, the server or computing device retrieves the VMR information. In Step S303, the server or computing device evaluates the DTMs to be recommended, based on the historical information and the VMR information associated with the DTM. In Step S304, the server or computing device generates a result of evaluation on the DTMs to be recommended and generates, based on the result of evaluation, a recommend list including one or more recommended DTMs to be launched in at least one of the plurality of client devices. The server or computing device includes one or more software components, one or more memories storing the one or more software components, and one or more processors configured to execute the one or more software components to perform the method.

In some cases, the server or computing device consolidates a default association list and a user-defined association list to generate a global association list commonly available to a plurality of client devices, where the global association list is subject to updating by any one of the plurality of client devices through the server or computing device. The default association list is a default list of association between the DTMs and a VMR information related to vendor, model and revision of the field device. The default association list is subject to update by the server upon receipt by the server of update information from any one of the plurality of client devices. The user-defined association list is a user-defined list of association between the DTMs and a VMR information related to vendor, model and revision of the field device. The user defined list of association is defined by a user.

A computer program product may include, but is not limited to, computer instructions stored on at least one non-transitory computer readable medium, wherein the computer instructions are operable when executed by at least one processor to perform: a) determining whether a first mode or a second mode is used for determining a device-type-manager (DTM) for performing a task on a field device in accordance with a request to perform the task on the field device; b) if it is determined that the second mode is used, b-1) identifying the DTM associated with the field device from a global association list commonly available to a plurality of client devices and a server, the global association list being subject to updating by any one of the plurality of client devices through the server, b-2) determining whether or not the DTM identified has been installed in the at least one of the plurality of client devices; and b-3) generating a notification to install the DTM identified to perform the task on the field device in another case that it is determined that the DTM is not installed in the at least one of the plurality of client devices; and c) if it is determined that the second mode is not selected, generating a recommend list including one or more recommended DTMs to be launched.

In some cases, the computer program product may further include, but is not limited to, additional computer instructions stored on the at least one non-transitory computer readable medium, wherein the additional computer instructions are operable when executed by at least one processor to perform: sorting the recommend list, based on one or more predefined rules, the one or more predefined rules includes a selection history of the DTMs launched for the field devices in the at least one of the plurality of client devices.

In some cases, the computer program product may further include, but is not limited to, still additional computer instructions stored on the at least one non-transitory computer readable medium, wherein the still additional computer instructions are operable when executed by at least one processor to perform: generating a historical information of user's historical selection to the DTMs; generating a result of retrieval for a VMR information related to vendor, model and revision of the field device, the VMR information being associated with the DTM; and generating a result of evaluation on the DTMs to be recommended. The historical information of user's historical selection to the DTMs represents a selected DTM and the VMR information of the selected DTM. The evaluation is made based on the historical information and the VMR information associated with the DTM. The recommend list including the one or more recommended DTMs to be launched is generated based on the result of evaluation on the DTMs to be recommended.

A computer program product may include, but is not limited to, computer instructions stored on at least one non-transitory computer readable medium, wherein the computer instructions are operable when executed by at least one processor to perform: identifying a historical information of user's historical selection to device-type-managers (DTMs), the historical information representing a selected DTM and a VMR information of the selected DTM, the VMR information being related to vendor, model and revision of a field device, the VMR information of the selected DTM being associated with the selected DTM; retrieving, by the server, the VMR information; and evaluating, by the server, the DTMs to be recommended, based on the historical information and the VMR information associated with the DTM, and generating, by the server, a result of evaluation on the DTMs to be recommended to allow at least one of the plurality of client devices to generate a recommend list including one or more recommended DTMs to be launched, based on the result of evaluation.

In some cases, the computer program product may further include, but is not limited to, additional computer instructions stored on the at least one non-transitory computer readable medium, wherein the additional computer instructions are operable when executed by at least one processor to perform: consolidating a default association list and a user-defined association list to generate a global association list commonly available to the plurality of client devices, the global association list being subject to updating by any one of the plurality of client devices through the server. The default association list is a default list of association between the DTMs and a VMR information related to vendor, model and revision of the field device, the default association list is subject to update by the server upon receipt by the server of update information from any one of the plurality of client devices. The user-defined association list is a user-defined list of association between the DTMs and a VMR information related to vendor, model and revision of the field device, the user defined list of association is defined by a user.

A computing device may include, but is not limited to, a software component; a memory storing the software component; and a processor configured to execute the software component to perform at least: a) determining whether a first mode or a second mode is used for determining a device-type-manager (DTM) for performing a task on a field device in accordance with a request to perform the task on the field device; b) if it is determined that the second mode is used, b-1) identifying the DTM associated with the field device from a global association list commonly available to a plurality of client devices and a server, the global association list being subject to updating by any one of the plurality of client devices through the server, b-2) determining whether or not the DTM identified has been installed in the at least one of the plurality of client devices; b-3) generating a notification to install the DTM identified to perform the task on the field device in another case that it is determined that the DTM is not installed in the at least one of the plurality of client devices; and c) if it is determined that the second mode is not used, generating a recommend list including one or more recommended DTMs to be launched.

In some cases, the processors are configured to execute the software component to further perform at least: sorting the recommend list, based on one or more predefined rules, the one or more predefined rules includes a selection history of the DTMs launched for the field devices in the at least one of the plurality of client devices.

In some cases, the processors are configured to execute the software component to further perform at least: generating a historical information of user's historical selection to the DTMs; generating a result of retrieval for a VMR information related to vendor, model and revision of the field device, the VMR information being associated with the DTM; and generating a result of evaluation on the DTMs to be recommended. The historical information of user's historical selection to the DTMs represents a selected DTM and the VMR information of the selected DTM. The evaluation is made based on the historical information and the VMR information associated with the DTM. The recommend list including the one or more recommended DTMs to be launched is generated based on the result of evaluation on the DTMs to be recommended.

The method and system in the embodiments are to provide a way for some products such as a plant asset management, a device configuration tool and benchtop application to synchronize the device-type manager (DTM) packages. The method and system in the embodiments are to use a default association in addition to a user association, wherein the default association is based from the update of DTMs. The method and system in the embodiments are to allow storing and remembering associations made by users. The method and system in the embodiments are to consolidate a default association list and a user association list to generate a consolidated list of association or all association list and return it to a client. For example, DTM installation package that a standalone engineering tool, plant asset management and benchtop application will be using to synchronize the DTMs especially in distributed environments such as the plant asset management (PAM). Multiple products have a list of DTMs and associations. A centralized DTM package server holds a default association list and a user association list. Server-client architecture sets up wherein PAM clients have a list of DTMs installed and the associations. PAM server will hold the default association list and the user association list. Standalone engineering tool and benchtop application are stand-alone products, not following the client-server architecture.

Figure 4:
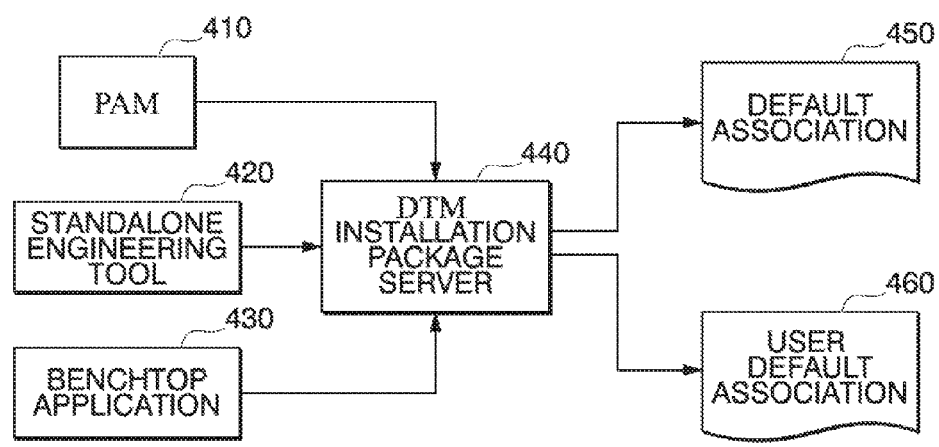
FIG. 4 is a diagram illustrating the positioning of the products in the usage of a DTM installation package server.

FIG. 4 is a diagram illustrating the positioning of the products in the usage of a DTM installation package server. The plant asset management (PAM) 410 which refers to software tool that works with control systems such as process control system and safety control system. With the PAM and intelligent field devices, operators and maintenance personnel can monitor the condition of plant assets remotely. The plant asset management (PAM) 410 detects early signs of performance deterioration such as valve sticking and impulse line blocking. By helping curtail excessive preventive maintenance and enabling more predictive and proactive maintenance, the plant asset management (PAM) 410 opens the way to asset predictability.

The device configuration tool may be a standalone engineering tool 420 which is a PC-based device configuration tool with an intuitive, user-friendly interface that is used to perform initial setup, routine maintenance, and device replacement. The device configuration tool supports all major industry-standard communication protocols such as FOUNDATION™ fieldbus, BRAIN, HART®, PROFIBUS® and Modbus as well as the FDT/DTM open software execution frame.

The device-type manager (DTM) installation packages 440 may be implemented by a package server. The DTM installation packages 440 would allow each of the plant asset management 410, the device configuration tool 420 and benchtop application 430 to be notified about a new DTM version installed for a particular Vendor Model Revision (VMR) of a field device through associations. The information of association will be saved on two places, a default association 450 and a user defined association 460. The default association 450 contains association information generated by the update or upgrade of the DTMs. The user association 460 contains association set by a user.

Figure 5:
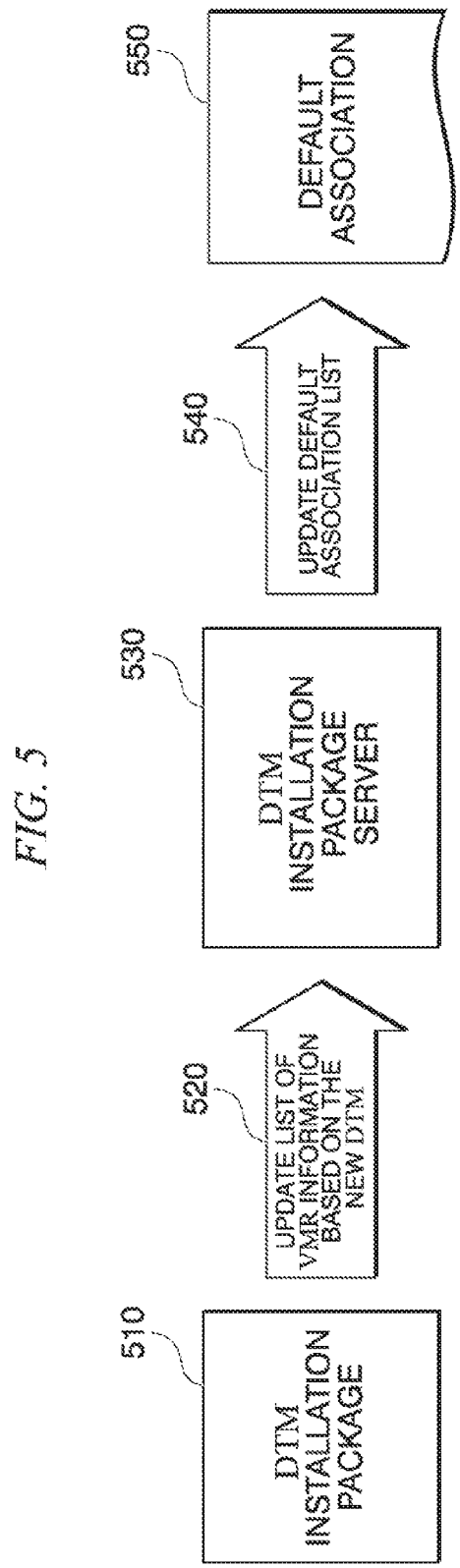
FIG. 5 is a view illustrating the process for the updating of the default association whenever DTMs were upgraded or installed.

FIG. 5 is a view illustrating the process for the updating of the default association whenever DTM were upgraded or installed. Whenever DTMs in a DTM installation package 510 containing DTMs were updated or upgraded, updating of catalog information and association of the DTMs to devices will be performed. The list 520 of the VMR information is made based on the new, updated or upgraded DTMs. The DTM installation package server 530 as the package server will create a default association based on the VMR Information and its corresponding DTM provided by the DTM. The DTM installation package server 530 performs the updating 540 of the list of the default associations. The default association 550 will only be performed for every DTMs upgrade.

Figure 6:
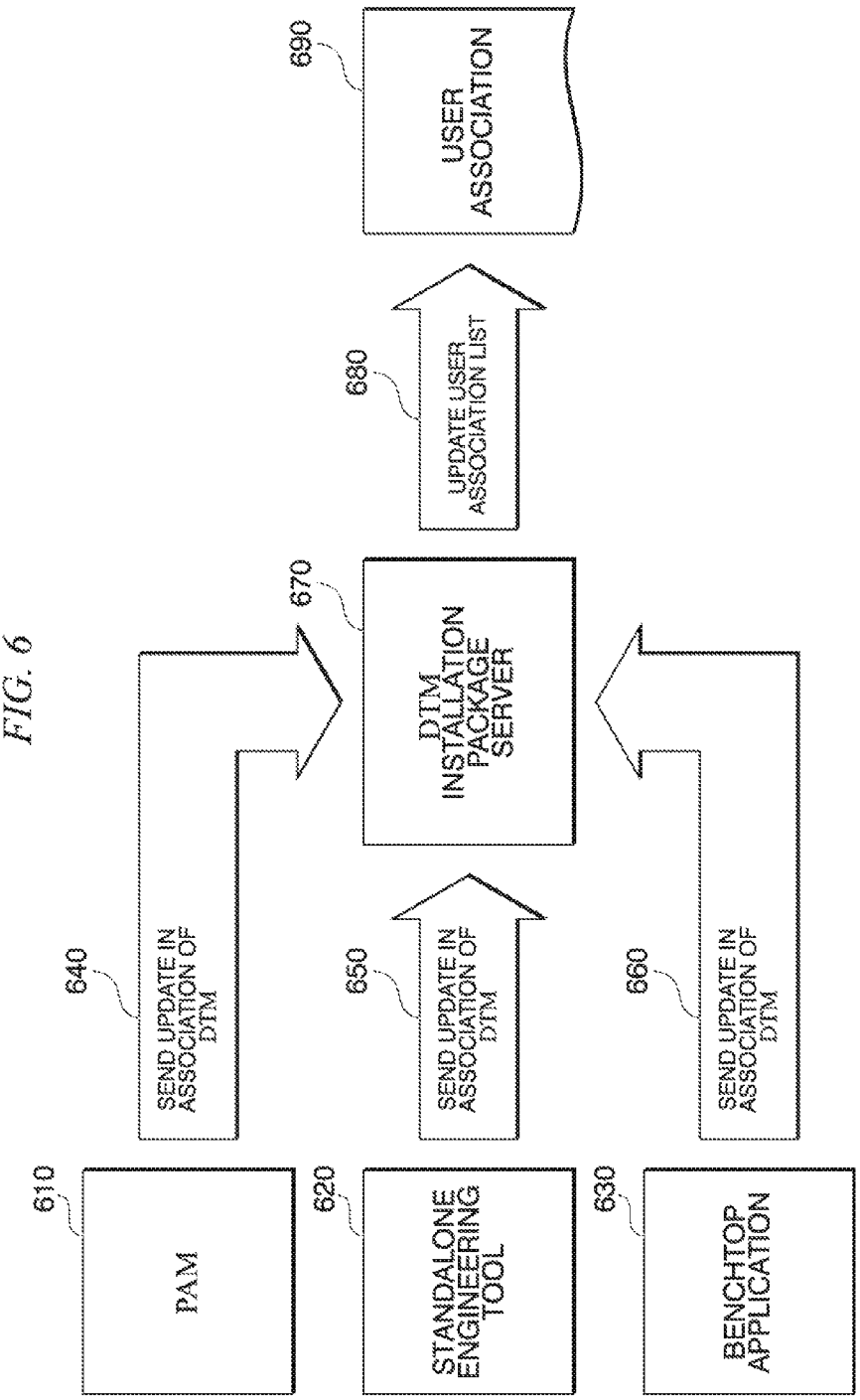
FIG. 6 is a view illustrating the updating of user association from different products such as the plant asset management, the device configuration tool and the benchtop application.

FIG. 6 is a view illustrating the updating of user association from different products such as the plant asset management, the device configuration tool and the benchtop application. The plant asset management may be a plant asset management (PAM) 610. The device configuration tool may be a standalone engineering tool 620. The client products such as the PAM 610, the standalone engineering tool 620, and benchtop application 630 served as a client that can send the association information to a package server (DTM Installation Package Server) 670. The plant asset management (PAM) 610 sends the updated information of association 640 between the plant asset management (PAM) 610 and the device-type manager (DTM). The device configuration tool (standalone engineering tool) 620 sends the updated information, of association 650 between the device configuration tool (standalone engineering tool) 620 and the device-type manager (DTM). The benchtop application 630 sends the updated information of association 660 between the benchtop application 630 and the device-type manager (DTM). Each time the client such as the plant asset management (PAM) 610, the device configuration tool (standalone engineering tool) 620 or the benchtop application 630 sends the updated information of association 640, 650 or 660 to the package server 670, the package server 670 will update the user association list 680 in the user association 690. The update can be made by corresponding action to a particular association such as addition or removal.

The package server may be configured to give the associations to the DTMs either by retrieving all associations or by retrieving association using a VMR information.

(Retrieving All DTM Associations)

Figure 7:
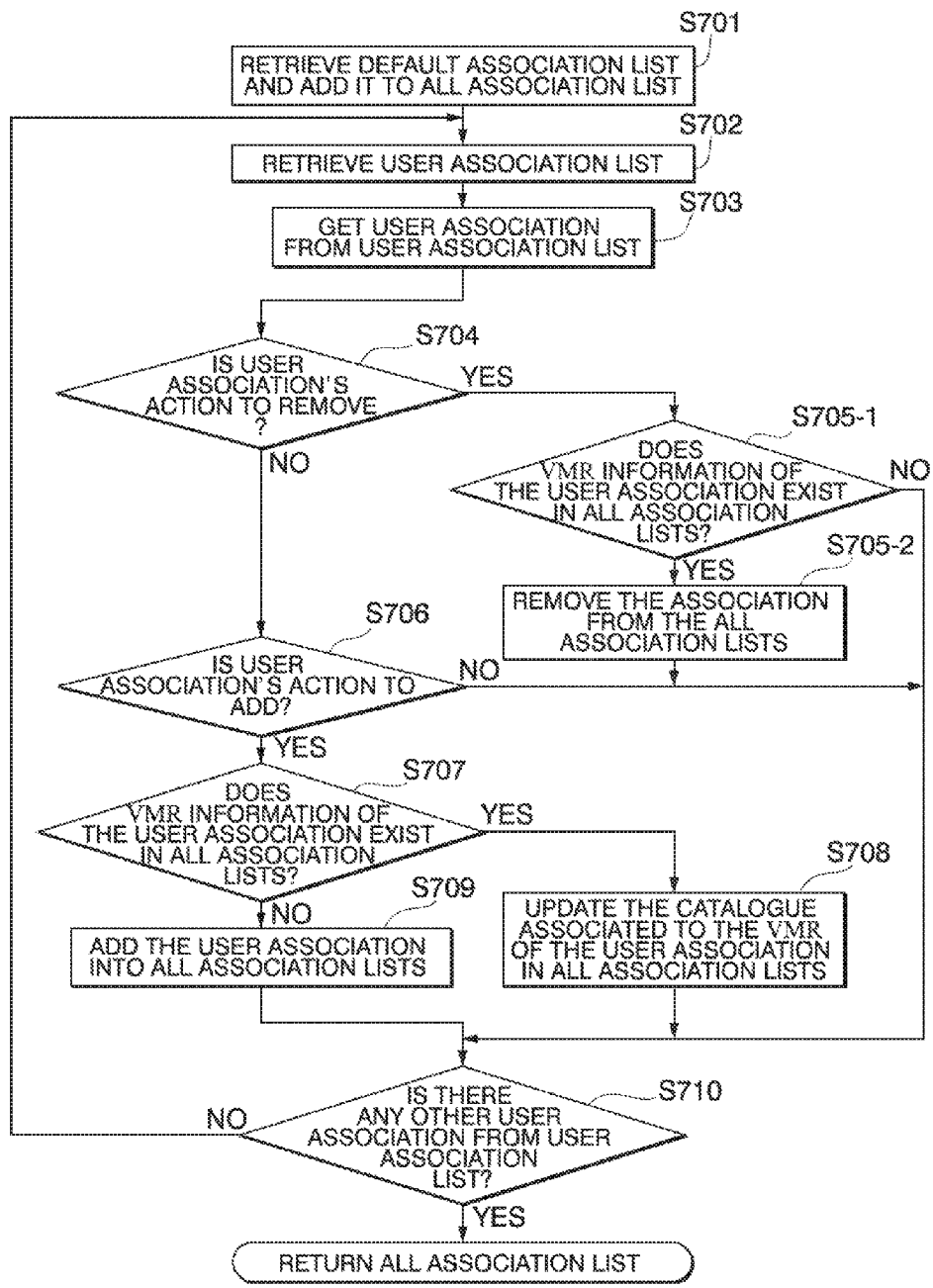
FIG. 7 is a flowchart illustrating the server process for giving the associations to the DTMs either by retrieving all associations.

FIG. 7 is a flowchart illustrating the server process for giving the associations to the DTMs either by retrieving all associations. The package server (DTM Installation Package Server) retrieves over the default association list and reads the default associations. Then the package server (DTM Installation Package Server) places the default associations as read into a list of all associations. Namely, the package server (DTM Installation Package Server) adds the default associations into the all association list. In S702, the package server (DTM Installation Package Server) retrieves a user association from the user association list. In S703, the package server (DTM Installation Package Server) retrieves and reads each association on the user association list.

For every user association in the all associations list, the package server (DTM Installation Package Server) identifies whether the action of the user association is to remove or add each user association from or to the all associations list, and further verifies whether a VMR information of the user association already exists in the all associations list, based on the VMR information of the user association. The order of verification to the type of action, for example, addition or removal, of the user association may be optional. In some cases, the verification to the removal action may be followed by the verification to the addition action. In other cases, the verification to the removal action may follow the verification to the addition action. In this embodiments illustrated in FIG. 7, the verification to the removal action may be followed by the verification to the addition action.

In Step 704, the package server (DTM Installation Package Server) verifies whether the type of action of the user association is to remove a user association from the all associations list. If the package server (DTM Installation Package Server) determines that the type of action of the user association is to remove the user association from the all associations list, then in S 705-1 the package server (DTM Installation Package Server) verifies whether the VMR information of the user association already exists in the all associations list. If in S705-1 the package server (DTM Installation Package Server) determines that the VMR information of the user association already exists in the ah associations list, then in Step 705-2, the package server (DTM Installation Package Server) removes the user association from the all associations list.

In Step 704, if the package server (DTM Installation Package Server) determines that the type of action of the user association is not to remove the user association from the all associations list, then in S706, the package server (DTM Installation Package Server) verifies whether the type of action of the user association is to add the user association into the all associations list. If in S706 the package server (DTM Installation Package Server) determines that the type of action of the user association is to add the user association into the all associations list, then in Step S707 the package server (DTM Installation Package Server) verifies whether the VMR information of the user association already exists in the all associations list. If in Step S707 the package server (DTM Installation Package Server) determines that the VMR information of the user association already exists in the all associations list, then in Step 708, the package server (DTM Installation Package Server) updates the catalogue associated to the VMR information of the user association in the all associations list. If in Step S707 the package server (DTM Installation Package Server) determines that the VMR information of the user association does not exist in the all associations list, then in Step 709, the package server (DTM Installation Package Server) adds the user association into the all associations list.

If in S705-1 the package server (DTM Installation Package Server) determines that the VMR information of the user association does not exist in the all associations list, then in Step 710, the package server (DTM Installation Package Server) verifies whether there still remains any other user association which has not yet been verified in the all associations list. The package server (DTM Installation Package Server) will continue the verification processes mentioned until the package server (DTM Installation Package Server) has verified all the user associations in the all associations list. If in Step 710, the package server (DTM Installation Package Server) determines that another user association, which has not yet been verified, still remains in the all associations list, then in Step S02 the package server (DTM Installation Package Server) retrieves another user association from the user association list.

After S705-2 the package server (DTM Installation Package Server) determines that the package server (DTM Installation Package Server) removed the user association from the all associations list, then in Step 710, the package server (DTM Installation Package Serve) verifies whether there still remains any other user association which has not yet been verified in the all associations list. If in Step 710, the package server (DTM Installation Package Server) determines that another user association, which has not yet been verified, still remains in the all associations list, then in Step 502 the package server (DTM Installation Package Server) retrieves another user association from the user association list.

If in S706 the package server (DTM Installation Package Server) determines that the type of action of the user association is not to add the user association into the all associations list, then in Step 710, the package server (DTM Installation Package Server) verifies whether there still remains any other user association which has not yet been verified in the all associations list. If in Step 710, the package server (DTM Installation Package Server) determines that another user association, which has not yet been verified, still remains in the all associations list, then in Step S02 the package server (DTM Installation Package Server) retrieves another user association from the user association list.

After in Step 708, the package server (DTM Installation Package Server) updated the catalogue associated to the VMR information of the user association in the all associations list, then in Step 710, the package server (DTM Installation Package Server) verifies whether there still remains any other user association which has not yet been verified in the all associations list. If in Step 710, the package server (DTM Installation Package Server) determines that another user association, which has not yet been verified, still remains in the all associations list, then in Step S02 the package server (DTM Installation Package Server) retrieves another user association from the user association list.

After in Step 709, the package server (DTM Installation Package Server) added the user association into the all associations list, then in Step 710, the package server (DTM Installation Package Server) verifies whether there still remains any other user association which has not yet been verified in the all associations list. If in Step 710, the package server (DTM Installation Package Server) determines that another user association, which has not yet been verified, still remains in the all associations list, then in Step 502 the package server (DTM Installation Package Server) retrieves another user association from the user association list.

If in Step 710, the package server (DTM Installation Package Server) determines that no further user association, which has not yet been verified, yet remains in the all associations list, then the package server (DTM Installation Package Server) finalizes the process for updating the all association list and returns the all association list to the clients such as the client products such as the PAM, standalone engineering tool, and benchtop application.

(Retrieving Association Using VMR Information)

Figure 8:
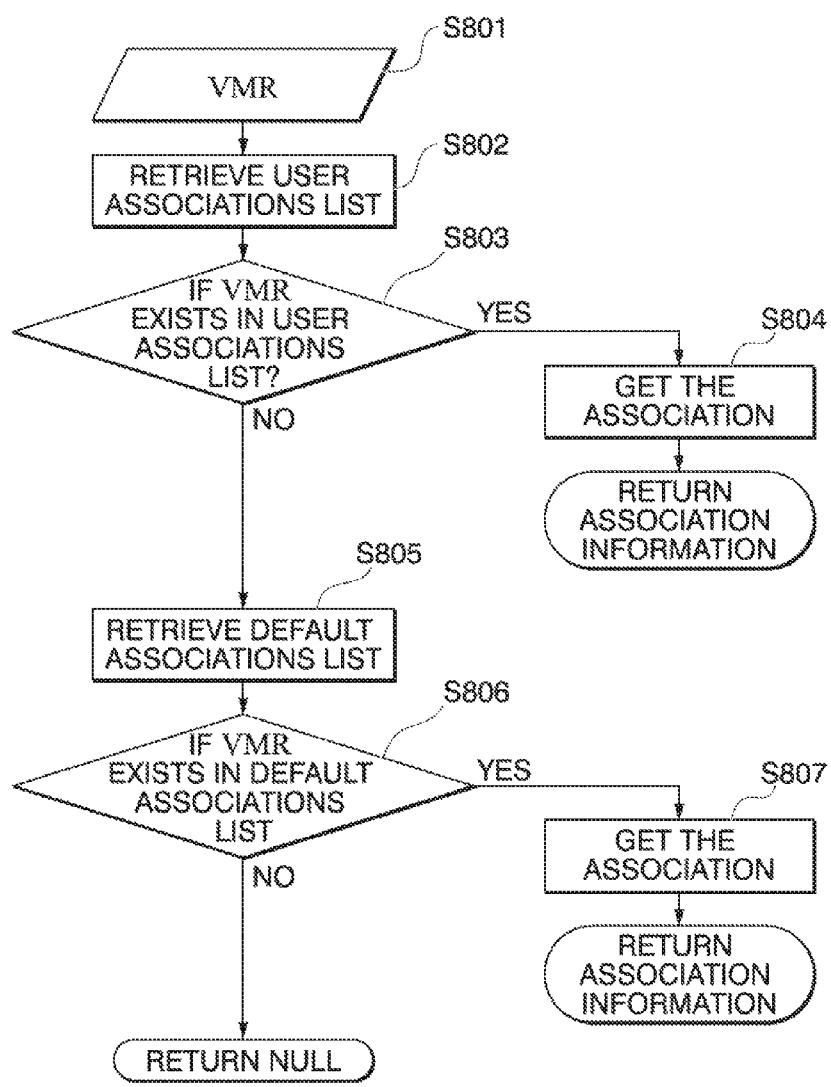
FIG. 8 is a flowchart illustrating the process for giving the associations to the DTMs either by retrieving association using, a VMR information.

FIG. 8 is a flowchart illustrating the process for giving the associations to the DTMs either by retrieving association using a VMR information.

The client such as the PAM, standalone engineering tool, or benchtop application sends the VMR Information to the package server (DTM Installation Package Server). In Step S801, the package server (DTM Installation Package Server) receives the VMR information from the client such as the PAM, standalone engineering tool, or benchtop application. In Step S802, the package server (DTM Installation Package Server) use the VMR information as received and retrieves the VMR information over the user association list. In Step S803, the package server (DTM Installation Package Server) verifies whether the VMR information exists in the user association list. If in Step 803, the package server (DTM Installation Package Server) determines that the VMR information exists in the user association list, then in Step S804, the package server (DTM Installation Package Server) gets a user association corresponding to the VMR information from the user association list and returns the user association information to the client such as the PAM, standalone engineering tool, or benchtop application, which had sent the VMR information to the package server (DTM Installation Package Server). If in Step 803, the package server (DTM Installation Package Server) determines that the VMR information does not exist in the user association list, then in Step S805, the package server (DTM Installation Package Server) retrieves the VMR information over the default association list. If in Step 806, the package server (DTM Installation Package Server) determines that the VMR information exists in the default association list, then in Step S807, the package server (DTM Installation Package Server) gets a default association corresponding to the VMR information from the default association list and returns the default association information to the client such as the PAM, standalone engineering tool, or benchtop application, which had sent the VMR information to the package server (DTM Installation Package Server). If in Step 806, the package server (DTM Installation Package Server) determines that the VMR information does not exist in the default association list, then the package server (DTM Installation Package Server) returns null to the client. In other words, the package server (DTM Installation Package Server) returns null to the client if the package server (DTM Installation Package Server) determines that the VMR information does not exists in both the user association list and the default association list. The package server (DTM Installation Package Server) returns the user association corresponding to the VMR information if the package server (DTM Installation Package Server) determines that the VMR information exists in the user association list. The package server (DTM Installation Package Server) returns the default association corresponding to the VMR information if the package server (DTM Installation Package Server) determines that the VMR information exists in the default association list.

In some cases, the package server (DTM Installation Package Server) may be configured to automatically update or install the DTMs whenever the package server (DTM Installation Package Server) determines that the DTMs is not updated through the association information which has been given by the package server (DTM Installation Package Server).

The package server (DTM Installation Package Server) as described above are thus configured to allow the client such as the PAM, standalone engineering tool, or benchtop application to synchronize the DTMs which will be used for the same vendor, model and revision (VMR) of field devices. The package server (DTM Installation Package Server) as described above are designed or configured for distributed environments such as the plant asset management PAMs. The package server (DTM Installation Package Server) as described above are designed or configured to allow synchronization of the DTM association for every vendor, model and revision (VMR) of field devices whenever there are DTMs upgraded or downgraded. The package server (DTM Installation Package Server) as described above are designed or configured to easily identify any DTM which has not yet been updated to the latest version.

The following embodiments are directed to scanning function of a Device Type Manager (DTM) working within a Field Device Tool (FDT) frame.

Figure 9:
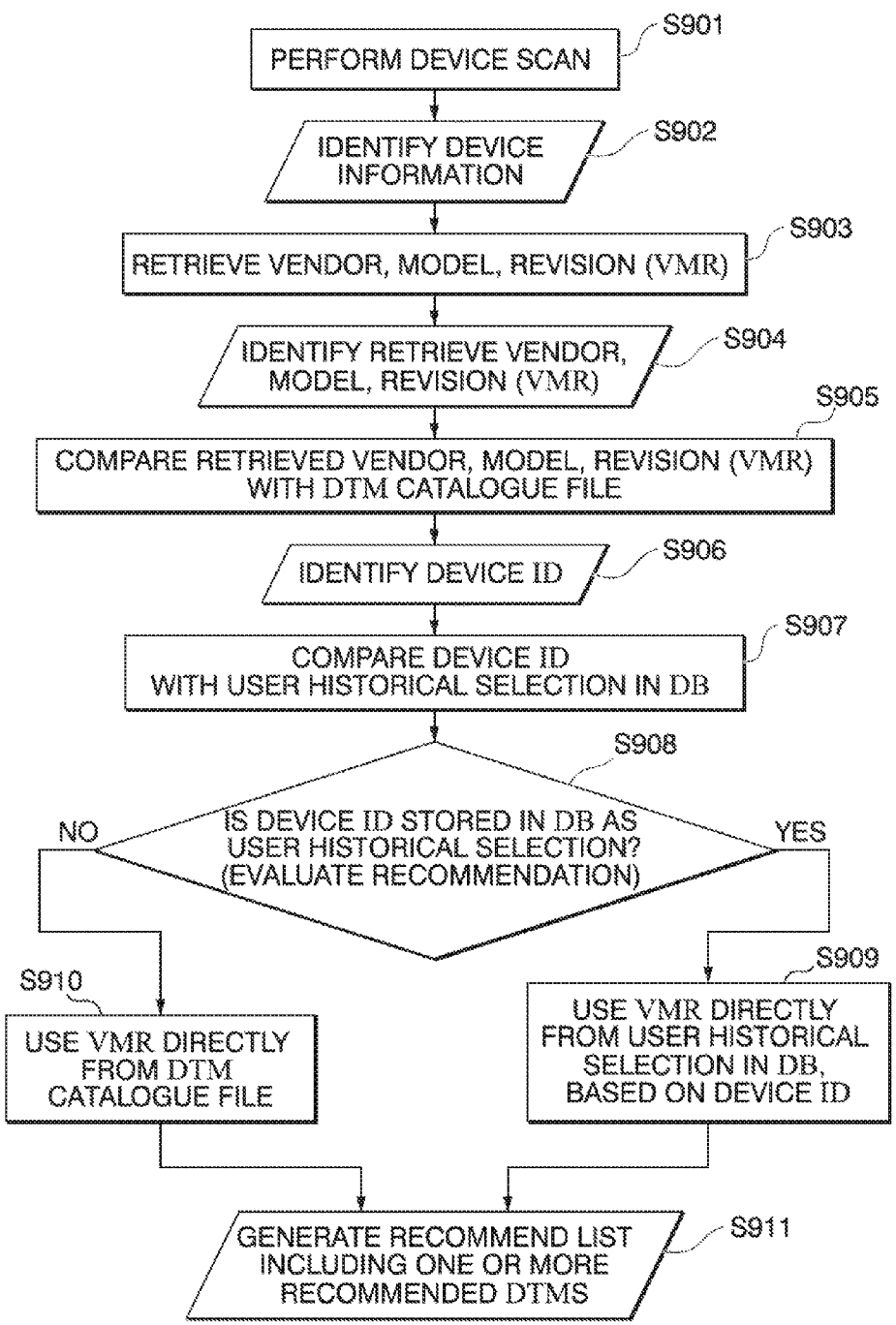
FIG. 9 is a flowchart of processes for generating a recommendation list including recommended device-type mangers (DTMs) working within a field device tool (FDT) frame.

The package server (DTM Installation Package Server) is configured to recommend a device-type manager (DTM) based on a user's selection history. In a case of multiple device-type managers (DTMs) recommended by the package server (DTM Installation Package Server), a user will have a quicker browsing through a result of the recommendations. The package server (DTM Installation Package Server) is configured to remember a user's preference for selection. FIG. 9 is a flowchart of processes for generating a recommendation list including recommended device-type mangers (DTMs) working, within a field device tool (FDT) frame. In Step S901, the package server (DTM Installation Package Server) performs a device scanning. In Step S902, the package server (DTM Installation Package Server) identifies a device information. In Step S903, the package server (DTM Installation Package Server) retrieves the vendor, model and revision (VMR). In Step S904, the package server (DTM Installation Package Server) identifies the retrieved vendor, model and revision (VMR). In Step S905, the package server (DTM Installation Package Server) compares retrieved vendor, model, revision (VMR) with a catalogue file of the device-type manager (DTM). In Step S906, the package server (DTM Installation Package Server) identifies a device ID. In Step S907, the package server (DTM Installation Package Server) compares the identified device ID with user historical selections in data base DB. In Step S908, the package server (DTM Installation Package Server) verifies whether the identified device ID is stored in the data base DB as a user historical selection. If in Step S908, the package server (DTM Installation Package Server) determines that the identified device ID is stored in the data base DB as a user historical selection, then in Step S909, the package server (DTM Installation Package Server) gets the VMR information directly from the user historical selections in the data base DB, based on the device ID. After in Step S909, the package server (DTM Installation Package Server) gets the VMR information directly from the user historical selections, then in Step S911 the package server (DTM Installation Package Server) uses the VMR information and generates a recommendation list including one or more recommended device-type managers (DTMs). If in Step S907, the package server (DTM Installation Package Server) determines that the identified device ID is not stored in the data base DB as a user historical selection, then in Step S910, the package server (DTM Installation Package Server) gets the VMR information directly from the catalogue file of the device-type manager (DTM). After in Step S910, the package server (DTM Installation Package Server) gets the information directly from the catalogue file of the device-type manager (DTM), then in Step S911 the package server (DTM Installation Package Server) uses the VMR information and generates a recommendation list including one or more recommended device-type managers (DTMs).

Figure 10:
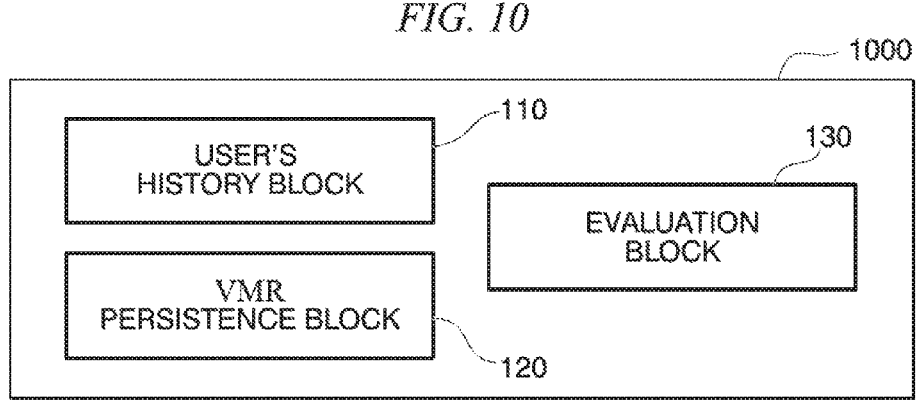
FIG. 10 is a block diagram illustrating configurations of a device-type manager scan recommendation logic for generating the recommendation list including one or more recommended device-type managers (DTMs).

The processes for generating the recommendation list including one or more recommended device-type managers (DTMs) can be implemented by a device-type manager scan recommendation logic. FIG. 10 is a block diagram illustrating configurations of a device-type manager scan recommendation logic for generating the recommendation list including one or more recommended device-type managers (DTMs). A device-type manager scan recommendation logic 1000 may include, but is not limited to, a user's history block 110, a VMR persistence block 120, and an evaluation block 130. The user's history block 110 is configured to store, together with the VMR information, a unique device identifier contained in some information that the device returns every time a user performs the DTM scan operation. The user's history block 110 is configured to store or save information for users historical selections of the device-type managers (DTMs). The information for users historical selections may be a "key" representing the selected DTM, and "value" representing the vendor, model and revision of the selected DTM. The VMR persistence block 120 is a component that every field device tool (FDT) frame has. The VMR persistence block 120 contains the vendor, model and revision (VMR) information of the DTMs installed on the user's machine. The VMR persistence block 120 is configured to allow retrieval of the VMR information of the DTM. The evaluation block 130 is configured to perform a decision making on what DTM is to be recommended based on the user's history block 110 and the VMR persistence block 120 described above. The evaluation block 130 is configured to include an evaluation logic on how to evaluate the recommended DTM.

Figure 11:
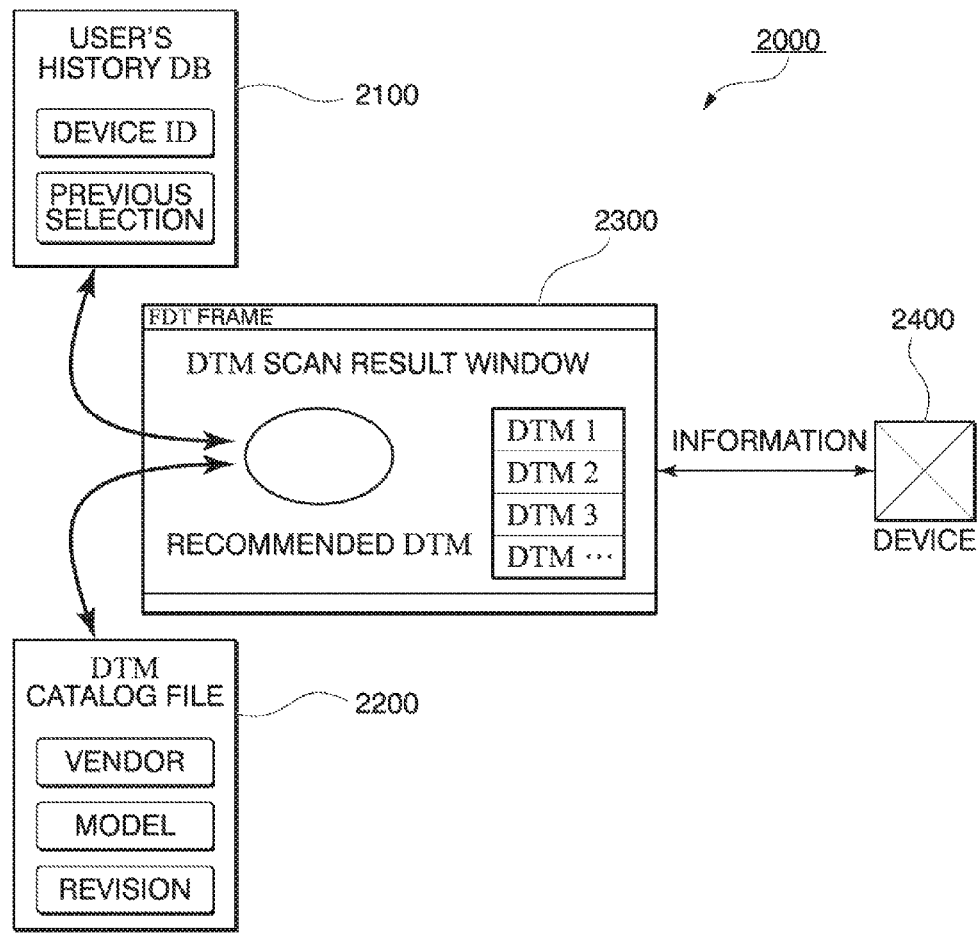
FIG. 11 is a block diagram illustrating a device-type manager scan recommendation system to be used for implementing the device-type manager scan recommendation logic of FIG. 10.

FIG. 11 is a block diagram illustrating a device-type manager scan recommendation system to be used for implementing the device-type manager scan recommendation logic of FIG. 10. A device-type manager scan recommendation system 2000 may include, but is not limited to, a user's history data base DB 2100, a DTM catalogue file 2200, and a field device tool frame 2300. The user's history data base DB 2100 stores device IDs and previous user's selections. The DTM catalogue file 2200 contains the vendor, model and revision information. The field device tool frame 2300 has a DTM scan result window which displays a result of the DTM scan, and a list of recommended DTMs. The field device tool frame 2300 includes the user's history block 110, the VMR persistence block 120, and the evaluation block 130. The field device tool frame 2300 is configured to send a generated recommendation list of DTMs to a client device 2400.

With reference to FIGS. 10 and 11, the user's history block 110 stores, in the user's history data base DB 2100, together with the VMR information, the unique device identifier contained in some information that the device returns every time a user performs the DTM scan operation. The user's history block 110 stores or saves, in the user's history data base DB 2100, information for users historical selections of the device-type managers (DTMs). The VMR persistence block 120 allows retrieval of the vendor, model and, revision (VMR) information of the DTMs installed on the user's machine over the DTM catalogue file 2200. The evaluation block 130 performs a decision making on what DTM is to be recommended based on the user's history block 110 and the VMR persistence block 120 described above. The evaluation block 130 is configured to include an evaluation logic on how to evaluate the recommended DTM.

In some cases, a persistence block and a VMR block may be represented by a single persistence object such as a single text file. This single persistence object will just have to contain a section or attribution to identify how much times a particular DTM has been used, so as to allow the evaluation to be performed based on the attribution. The number of times the particular DTM has been used or the latest date of use can be stored in either the DTM catalogue file or the association list. The following is an example of the single persistence object:

```
<DTMCatalogFile>
    <DTM1>
        <VMRInfo/>
        <AssociatedDeviceIds>
            <DeviceID="ID1", NumOfUse="10">
            <DeviceID="ID2", NumOfUse="3">
        </AssociatedDeviceIds>
    <DTM1>
<DTMCatlogFile>
```

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communications servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-em bedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution fur those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instruction.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method comprising:
    receiving, from a server, by at least one of a plurality of client devices accessible to the server, a historical information of user's historical selection to device-type-managers (DTMs), the historical information representing a selected DTM and a VMR information of the selected DTM, the VMR information being related to vendor, model and revision of a field device, the VMR information of the selected DTM being associated with the selected DTM;
    receiving, from the server, by the at least one of the plurality of client devices, a result of retrieval for the VMR information; and
    receiving, from the server, by the at least one of the plurality of client devices,
        a) a result of evaluation on the DTMs to be recommended, the evaluation being made, by the server, based on the historical information and the VMR information associated with the DTM; and
        b) a recommend list including one or more recommended DTMs to be launched, based on the result of evaluation on the DTMs to be recommended,
    wherein each of the server and the plurality of client devices comprises one or more software components, one or more memories storing the one or more software components, and one or more processors configured to execute the one or more software components to perform the method.

2. The method according to claim 1, wherein the recommend list is sorted based on one or more predefined rules, the one or more predefined rules comprises a selection history of the DTMs launched for the field devices in the at least one of the plurality of client devices.

3. The method according to claim 1, further comprising:
receiving a global association list, from the server, by the at least one of the plurality of client devices, the global association list having been updated by the server and stored in a database accessible by the server.

4. The method according to claim 1, further comprising:
receiving a global association list, from the server, by the at least one of the plurality of client devices, a global association list having been prepared by consolidating a default association list and a user-defined association list,
wherein the default association list is a default list of association between the DTMs and a VMR information related to vendor, model and revision of the field device, the default association list is subject to update by the computing device upon receipt by the computing device of update information from any one of the plurality of client devices, and
wherein the user-defined association list is a user-defined list of association between the DTMs and a VMR information related to vendor, model and revision of the field device, the user-defined list of association is defined by a user.

5. The method according to claim 1, further comprising:
receiving, from the server, by the at least one of the plurality of client devices, a result of determination on whether or not the DTM has been installed in the at least one of the plurality of client devices, wherein the determination being made using one of a DTM catalogue file, a system registry and path.

6. The method according to claim 5, wherein the DTM catalogue file comprises a local DTM catalogue stored in the client device to identify the DTMs locally installed in the client device.

7. The method according to claim 5, wherein the DTM catalogue file comprises a global DTM catalogue file stored in a database, and the global DTM catalogue file includes information indicating that all of the DTMs are installed in each of the plurality of client devices.

8. The method according to claim 1, further comprising:
receiving, from the server, by the at least one of the plurality of client devices, the historical information of user's historical selection to the DTMs.

9. The method according to claim 1, further comprising:
receiving, from the server, by the at least one of the plurality of client devices, a notification to install the DTM to perform a task on a field device in a case that the DTM is not installed in the at least one of the plurality of client devices.

10. A method comprising:
receiving, by a server, from at least one of a plurality of client devices accessible to the server, a VMR Information;
identifying, by the server, a historical information of user's historical selection to device-type-managers (DTMs), the historical information representing a selected DTM and the VMR information of the selected DTM, the VMR information being related to vendor, model and revision of a field device, the VMR information of the selected DTM being associated with the selected DTM;
retrieving, by the server by using the VMR Information, the VMR information over a user association list;
evaluating, by the server, the DTMs to be recommended, based on the historical information and the VMR information associated with the DTM, and
generating, by the server, a result of evaluation on the DTMs to be recommended and generating, based on the result of evaluation, a recommend list including one or more recommended DTMs to be launched by at least one of the plurality of client devices;
transmitting, by the server, to at least one of the plurality of client devices, the result of evaluation and the recommend list,
wherein the server comprises one or more software components, one or more memories storing the one or more software components, and one or more processors configured to execute the one or more software components to perform the method.

11. The method according to claim 10, wherein the recommend list is sorted based on one or more predefined rules, the one or more predefined rules comprises a selection history of the DTMs launched for the field devices in the at least one of the plurality of client devices.

12. The method according to claim 10, further comprising:
transmitting, by the server, to the at least one of the plurality of client devices, a global association list, the global association list having been updated by the server and stored in a database accessible by the server.

13. The method according to claim 10, further comprising:
transmitting a global association list, by the server, to the at least one of the plurality of client devices, the global association list having been prepared by consolidating a default association list and a user-defined association list,
wherein the default association list is a default list of association between the DTMs and a VMR information related to vendor, model and revision of the field device, the default association list is subject to update by the computing device upon receipt by the computing device of update information from any one of the plurality of client devices, and
wherein the user-defined association list is a user-defined list of association between the DTMs and a VMR information related to vendor, model and revision of the field device, the user-defined list of association is defined by a user.

14. The method according to claim 10, further comprising:
determining, by the server, using one of a DTM catalogue file, a system registry and path, whether or not the DTM has been installed in the at least one of the plurality of client devices.

15. The method according to claim 14, wherein the DTM catalogue file comprises a local DTM catalogue stored in the client device to identify the DTMs locally installed in the client device.

16. The method according to claim 14, wherein the DTM catalogue file comprises a global DTM catalogue file stored in a database, and the global DTM catalogue file includes information indicating that all of the DTMs are installed in each of the plurality of client devices.

17. The method according to claim 10, further comprising:
transmitting, by the server, to the at least one of the plurality of client devices, the historical information of user's historical selection to the DTMs.

18. The method according to claim 10, further comprising:
transmitting, by the server, to the at least one of the plurality of client devices, a notification to install the DTM to perform a task on a field device in a case that the server determined that the DTM is not installed in the at least one of the plurality of client devices.

19. A computer program product comprising computer instructions stored on at least one non-transitory computer readable medium, wherein the computer instructions are operable when executed by at least one processor to perform:
receiving, by the at least one processor, from at least one of a plurality of client devices accessible to the server, a VMR Information;
identifying, by the at least one processor, a historical information of user's historical selection to device-type-managers (DTMs), the historical information representing a selected DTM and the VMR information of the selected DTM, the VMR information being related to vendor, model and revision of a field device, the VMR information of the selected DTM being associated with the selected DTM;
retrieving, by the at least one processor, by using the VMR Information, the VMR information over a user association list;
evaluating, by the at least one processor, the DTMs to be recommended, based on the historical information and the VMR information associated with the DTM;
generating, by the at least one processor, a result of evaluation on the DTMs to be recommended to allow at least one of the plurality of client devices;
generating a recommend list including one or more recommended DTMs to be launched, based on the result of evaluation; and
transmitting, by the at least one processor, to at least one of the plurality of client devices, the result of evaluation and the recommend list.

20. The computer program product according to claim 19, further comprising additional computer instructions stored on the at least one non-transitory computer readable medium, wherein the additional computer instructions are operable when executed by at least one processor to perform:
consolidating, by the at least one processor, a default association list and a user-defined association list to generate a global association list commonly available to the plurality of client devices, the global association list being subject to updating by any one of the plurality of client devices through the server,
wherein the default association list is a default list of association between the DTMs and a VMR information related to vendor, model and revision of the field device, the default association list is subject to update, and
wherein the user-defined association list is a user-defined list of association between the DTMs and a VMR information related to vendor, model and revision of the field device, the user defined list of association is defined by a user.

21. A computing device comprising:
a software component;
a memory storing the software component; and
a processors configured to execute the software component to perform at least:
a) receiving, by the processor, a historical information of user's historical selection to device-type-managers (DTMs), the historical information representing a selected DTM and a VMR information of the selected DTM, the VMR information being related to vendor, model and revision of a field device, the VMR information of the selected DTM being associated with the selected DTM;
b) receiving, by the processor, a result of retrieval for the VMR information; and
c) receiving, by the processor, c-1) a result of evaluation on the DTMs to be recommended, the evaluation being made, by the server, based on the historical information and the VMR information associated with the DTM; and c-2) a recommend list including one or more recommended DTMs to be launched, based on the result of evaluation on the DTMs to be recommended.

22. A computing device comprising:
a software component;
a memory storing the software component; and
a processors configured to execute the software component to perform at least:
a) receiving, by the processor, from at least one of a plurality of client devices accessible to the computing device, a VMR Information;
b) identifying, by the processor, a historical information of user's historical selection to device-type-managers (DTMs), the historical information representing a selected DTM and the VMR information of the selected DTM, the VMR information being related to vendor, model and revision of a field device, the VMR information of the selected DTM being associated with the selected DTM;
c) retrieving, by the processor by using the VMR Information, the VMR information over a user association list;
d) evaluating, by the processor, the DTMs to be recommended, based on the historical information and the VMR information associated with the DTM;
e) generating, by the processor, a result of evaluation on the DTMs to be recommended;
f) generating, by the processor, based on the result of evaluation, a recommend list including one or more recommended DTMs to be launched by at least one of the plurality of client devices; and
g) transmitting, by the server, to at least one of the plurality of client devices, the result of evaluation and the recommend list.

* * * * *